Figure 1:
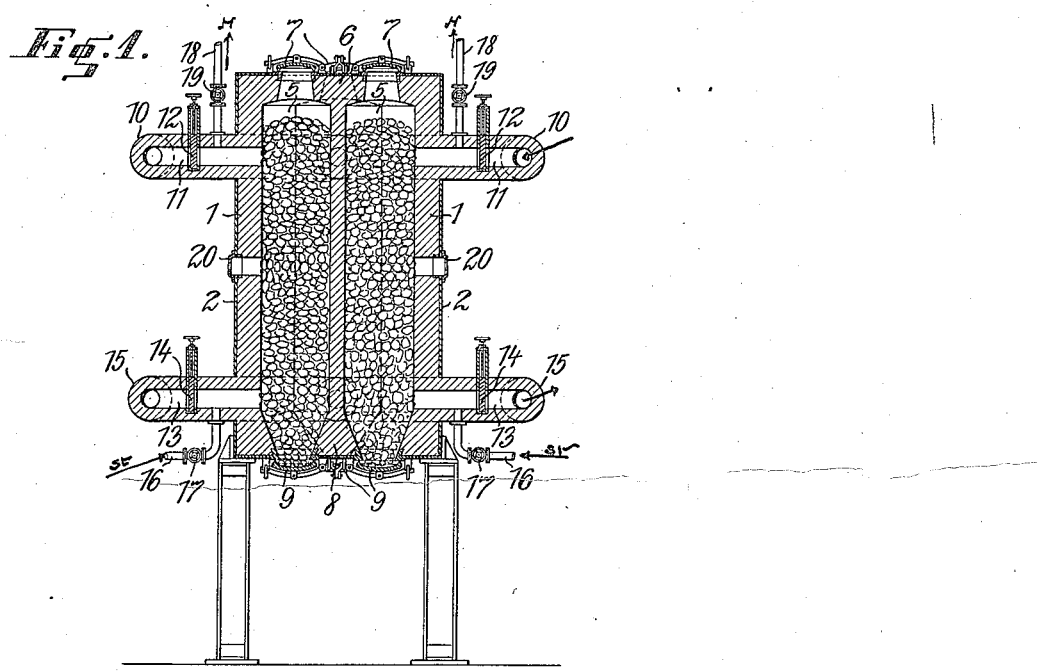

H. DICKE.
REDUCING AND OXIDIZING APPARATUS FOR GENERATING HYDROGEN FROM IRON ORE AND STEAM.
APPLICATION FILED DEC. 6, 1913.

1,129,559.

Patented Feb. 23, 1915.

Witnesses:
Johannes Fritze
Charles Maths

Inventor
Hugo Dicke
by John Lotka
Attorney

UNITED STATES PATENT OFFICE.

HUGO DICKE, OF BERLIN-WILMERSDORF, GERMANY, ASSIGNOR TO BERLIN-ANHALTISCHE MASCHINENBAU-AKTIEN-GESELLSCHAFT, OF BERLIN, GERMANY, A CORPORATION OF GERMANY.

REDUCING AND OXIDIZING APPARATUS FOR GENERATING HYDROGEN FROM IRON ORE AND STEAM.

1,129,559. Specification of Letters Patent. Patented Feb. 23, 1915.

Application filed December 6, 1913. Serial No. 804,999.

*To all whom it may concern:*

Be it known that I, HUGO DICKE, a subject of the German Emperor, and a resident of Berlin-Wilmersdorf, Germany, have invented certain new and useful Improvements in Reducing and Oxidizing Apparatus for Generating Hydrogen from Iron Ore and Steam, of which the following is a specification.

My invention relates to improvements in reducing and oxidizing apparatus for generating hydrogen from iron ore and steam.

In the manufacture of hydrogen on a large scale by the alternate reduction of iron ores by means of reducing gases, and oxidation by means of steam, iron retorts filled with iron ore and heated from the outside are almost exclusively employed. These retorts last only a short time and affect the cost of this process to an extraordinary extent. Retorts of refractory material can not be used as they very quickly become leaky and the hydrogen generated therein is consequently rendered impure by the entry of the heating gases, or it escapes through the leaky retort walls into the heating gases. Attempts have also been made to use large chambers of refractory material to receive the ores, and to heat them by means of the reducing gases. Such an arrangement however proved unsuccessful as the reducing gases as well as the steam introduced did not come into sufficient contact with the whole quantity of the iron ore, but only a portion of the latter was reduced or oxidized, according as the current of gas or steam became distributed within the chamber filled with the ores. On the other hand, the iron ores consumed, were exceedingly difficult to remove from these chambers, as owing to irregular heating, the ores partly melted and adhered to the walls or to each other.

The object of the improvements is to provide a reducing and oxidizing apparatus of this class in which these objections are overcome.

With this object in view my invention consists in a special novel construction of the apparatus in the form of an outer wall of refractory material and dividing the same into separate chambers which are also made of refractory material. Any leaks formed in the partitions cease to have a damaging effect as the same gases are always contained in all the adjoining shafts or compartments. To avoid losses of gas through any leaks in the wall of the cylinder, this wall is further surrounded by a gas tight metal jacket. Owing to this construction of the oxidizing and reducing vessel, a uniform action of the reducing gases and steam on the whole charge of or in each individual shaft is insured, and the temperature in the shafts can be regulated in such a manner that, while the whole column of ore is sufficiently heated, its partial melting is avoided. Each shaft is provided with closing devices at each end which facilitate introduction and discharge of the iron ore. By suitably arranging the supply and discharge pipes for the reducing gas and steam, and by providing them with controlling valves, it is further possible to cut out temporarily one of the shafts, so that the ore therein can be removed and the shaft refilled, while the adjoining shafts still continue to work.

For the purpose of explaining the invention an example embodying the same has been shown in the accompanying drawing, in which the same letters of reference have been used in all the views to indicate corresponding parts.

Figure 2:
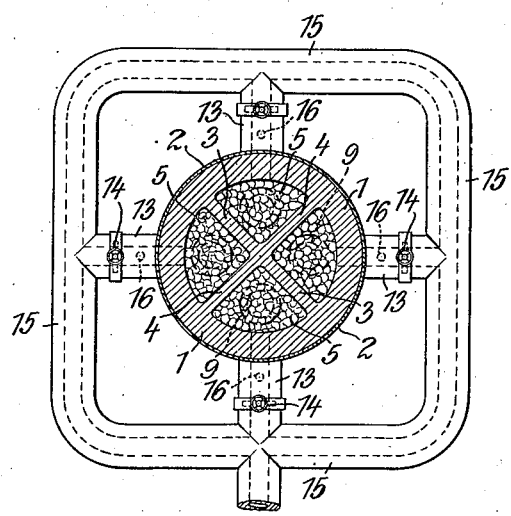

In said drawing Figure 1 shows in longitudinal section a reducing and oxidizing apparatus according to this invention, while Fig. 2 is a cross-section through the center of the apparatus.

In the example illustrated in the drawing, my improved apparatus comprises an outer cylinder wall 1 of refractory material, surrounded by a metal jacket 2, and has say, two partitions 3 and 4 extending diametrically across the cylinder chamber and forming the shafts 5. The cross section of the shafts 5 will depend on the shape of the partitions 3 and 4; in the construction shown, the cross-sections are in the form of sectors. In the cover 6 of the apparatus, over each shaft, is provided a closing device 7 through which iron ores are introduced into the shafts 5. In the same way, the bottom 8 of the reducing and oxidizing chamber is provided with mouth-pieces 9 in the axis of each shaft 5, intended for discharging the iron ores.

Around the cylinder or chamber is carried a gas pipe 10 which, by means of a branch 11 for each shaft 5, admits reducing gases into the upper portion of the same. Each branch 11 is provided with a valve 12, by means of which the supply of hot reducing gases can be shut off. From the bottom portion of each shaft 5 branches off another pipe 13 controlled by valves 14 and connected to a surrounding pipe 15 which discharges the reducing gases consumed, into a chimney or the like.

The steam supply pipes 16 to each shaft 6 open into its bottom portion. For instance, the steam supply pipe 16 can be introduced into the discharge pipes 13 for the reducing gases, and the escape of steam from the pipe 16 can be regulated by means of a valve 17. The hydrogen generated during the passage of steam through the column of ore in the shaft 5, escapes from this shaft through the gas discharge pipes 18 which open into the upper portion of the shafts 5, for instance into the supply pipe 11 for the reducing gases. The pipes 18 may also be controlled by means of valves 19 if desired.

By providing valves, such as 12 and 14 in the passages 11 and 13 communicating with the shafts I am also enabled to close any one of the shafts independently of the other one, so that the ore can be discharged from the said shaft while the other ones are still in operation. The shafts 5 are further provided with inspection apertures 20 to enable the heating of the iron ores to be watched, and to prevent the latter from being heated to their melting point.

While in describing the invention reference has been made to a particular embodiment thereof, I wish it to be understood that my invention is not limited to the construction shown in the figures, and that various changes may be made in the construction of the retort without departing from the gist of my invention. For example, it is not necessary to provide a furnace of circular cross-section, and to divide the same by diametrical partitions, nor is it necessary to pass the gases through the retort in the directions shown in the drawing.

I claim:

An oxidizing and reducing apparatus comprising a chamber having a wall of refractory material, a jacket of a material which is impermeable to gases inclosing said wall, partitions of refractory material dividing said chamber into sectional chambers or shafts, means to supply reducing and oxidizing gases separately to said sectional chambers or shafts, and means to shut off either one of the sectional chambers or shafts independently of the other ones.

In testimony whereof, I have signed this specification in the presence of two subscribing witnesses.

HUGO DICKE.

Witnesses:
 WOLDEMAR HAUPT,
 HENRY HASPER.